Figure 1:
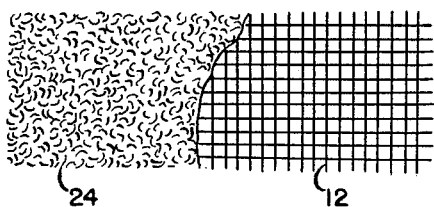

Sept. 11, 1962 J. G. ADILETTA 3,053,762
FILTER MATERIAL
Filed July 24, 1959

*INVENTOR.*
JOSEPH G. ADILETTA
BY
ATTORNEY

United States Patent Office 3,053,762
Patented Sept. 11, 1962

3,053,762
FILTER MATERIAL
Joseph G. Adiletta, Riverside, Conn., assignor to American Machine & Foundry Company, a corporation of New Jersey
Filed July 24, 1959, Ser. No. 829,308
3 Claims. (Cl. 210—507)

The present invention relates to filters and to a method of manufacturing filters, and more specifically to a filtering medium or material wherein the physical and chemical characteristics thereof may be predetermined and controlled.

The invention is particularly useful in applications in which is a filtering medium with special and specific properties is required, such as inertness to chemical action, unusual filter stiffness or strength, resistance to high temperature, special pore size, or the like. Novel and effective means are herein provided for separately controlling such properties.

It is well known in the filter art that the strength of a filtering medium is directly proportional to the thickness thereof, but the rate of flow of fluid through the medium is inversely proportional to said thickness. Heretofore, it has been necessary to compromise the foregoing factors, so that one property was necessarily sacrificed to obtain an optimum result in the other. Various means have been devised to solve this problem, but all have disadvantages. One method provides a binder glue on the fibers of a filter to augment the strength, but this also provides an obstructing mass within the voids of the material, thereby decreasing the filtration area and reducing the rate of flow.

Another method relies upon larger and coarser fibers to increase the strength of the filter. But this produces a material with relatively large pores, useless as a filter for applications where precise filtration is required.

The present invention eliminates the foregoing disadvantages by a novel filter material wherein woven inert cloth, such as of glass, is employed as a base for high tensile strength and upon which other fibers, such as glass, are deposited in a controlled blend and quantity as a paper type product and locked firmly to the cloth or woven material. The composite material may then be impregnated to acquire special chemical characteristics.

It is an object of the invention to provide a novel filter material wherein pore sizes may be controlled from a small diameter to a large diameter as desired.

Still another object of the invention is to provide a filter material of the above indicated nature which shall be extremely thin, yet of high tensile strength and durability.

Another object of the invention is to provide a novel filter material resistant to high temperatures and corrosive chemicals and adaptable to use therewith.

Still another object of the invention is to provide a process for manufacturing a thin, yet extremely durable filter material with a high rate flow, in a positive and effective manner, and yet simple and economical in operation.

Another object of the invention is to provide a novel filter material and a process for the manufacture thereof, wherein the various physical and chemical properties of the material such as the pore size, the thickness, the stiffness, the rate of flow therethrough, the resistance to temperature, and the like may all be separately predetermined and controlled.

The foregoing and other objects and advantages will appear more fully hereinafter from a consideration of the detailed description which follows, taken together with the accompanying drawing, wherein a preferred embodiment of the invention is illustrated by way of example.

Figure 2:
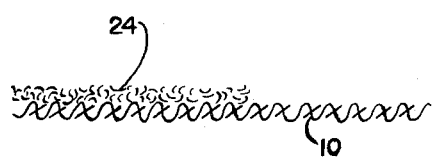
Figure 3:
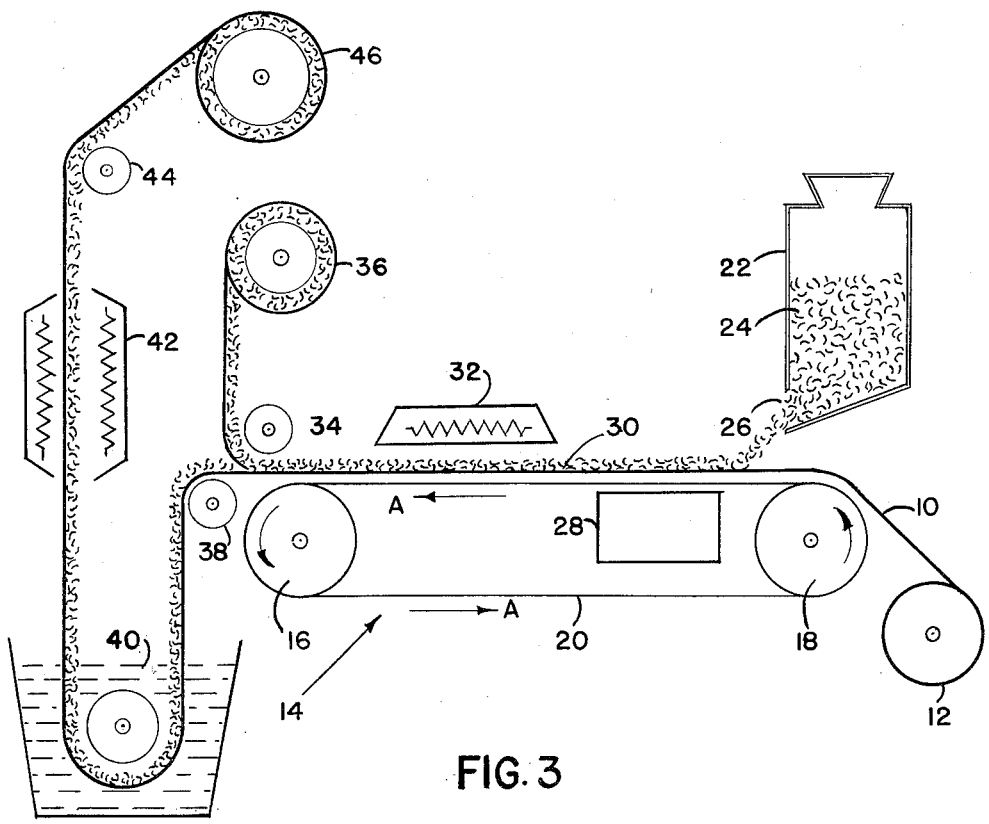

In the drawing wherein like reference characters designate like parts:
FIGURE 1 is a plan view partly cut away of the filter material of the invention.
FIGURE 2 is an elevational view of FIGURE 1.
FIGURE 3 is a schematic view of a process for manufacturing the novel filter material disclosed herein.

Example

Referring now to the drawing, and more particularly to FIGURE 3, a continuous strip 10, of woven cloth, for example of glass or mineral fiber, about one mill thick, unwinds from a fixed bolt 12, and is carried over a belt assembly generally designated by the numeral 14. The belt assembly 14 comprises a driving roller 16, actuated by conventional drive means (not shown here) and a driven roller 18. For reasons hereinafter explained, a connecting belt 20 enfolding the two rollers, is constructed of a metal or like screen material, so as to admit the free passage of fluids therethrough. Hence the screen belt 20 continuously travels in the direction designated by the arrows carrying the woven cloth strip 10, on the upper surface thereof. This is similar to a Fourdrinier machine.

A headbox or other suitable reservoir 22, contains, for example, a special blend of micro-fiber glass slurry 24, such as would be employed in the manufacture of glass fiber paper, as described in British Patent 769,687, which is discharged from the reservoir 22 through a metering orifice 26, and deposited onto the woven cloth strip 10, so that the woven cloth now becomes a substratum for the fibers (FIGURES 1 and 2).

The moving belt screen 20 next carries the woven cloth strip 10 with the fiber 24 deposited thereon over a vacuum box 28, so that cloth and slurry are subjected to the unequal pressure created by the vacuum box, and the fibers of the slurry are firmly locked onto the cloth 10. At this point a quantity of fluid is expelled from the slurry by the action of the vacuum box 28. Therefore, the belt 20 is constructed of a screenlike material, to facilitate the passage therethrough of the fluid expelled from the slurry.

The woven cloth strip 12 with the blend of micro fiber glass firmly united thereto is next carried under an open oven or radiant heater 32 for the final drying of the product. This forms a glass fiber paper type product over the woven cloth substratum (FIGS. 1 and 2), which by means of a guide roller 34, may now be rolled onto a take-up roll 36 as one form of the final filter product about two mils thick, for example when a nominal one mil cloth is used with the proper amount of fiber.

Means are now provided for imparting special physical characteristics to the material as may be desired, by bypassing the guide roller 34, onto an alternate guide roller 38. The alternate guide roller 38 is positioned to guide the finished material 30, through an impregnating bath within a reservoir 40. The impregnant within the reservoir 40 may be poly(tetrafluoroethylene), poly(trifluorochloroethylene) or another thermoplastic or maybe a material such as paint or silicone type resin to impart the special characteristics desired to the material. Thence the material is now guided through a temperature controlled oven 42 thereby drying the same, and curing or fusing the impregnant thereon.

The finished product is rolled up onto a take-up roll 46, being guided thereon by means of a standard guide roller 44. A feature of this material is controlled pore size up to about one hundred microns. The flow rate of a fluid through this material is about ten to forty times that for material comparable in pore size.

Having thus described the invention, in operation, it will now be apparent to those skilled in the art, that when the fiber glass slurry 24 is metered onto the woven cloth 10, and locked firmly thereto by operation of the vacuum box 28, and the drying oven 32, a glass fiber paper is formed over and interlocked into the woven cloth, and the resultant material will retain the high tensile strength properties of the woven cloth, and yet possess the filtration properties of the glass fiber paper.

It is to be noted that several types and thicknesses of woven cloth may be employed to advantage as a substratum, depending upon the magnitude of the tensile strength desired, and that the pore sizes of the material may be predetermined and controlled by the glass fiber blend slurry used, and by the quantity thereof permitted to be deposited onto the material 10 through the metering orifice 26. In this manner, the filter material may be relatively thin while retaining high tensile strength and durability. In addition, because of the constituents of the material, it may be used at high temperatures.

It will be appreciated that materials of various and special physical and chemical characteristics may be manufactured by immersing the already finished material 30 in the reservoir 40.

It will thus be seen that there is provided a novel filter material and means for the manufacture thereof, in which the several objects of this invention are achieved, and which is well adapted to meet the conditions of practical use. Applications include hydraulic systems, filtration, dialysis, gas pump filters, filter presses, water-oil separation, light-weight filters (replacing metal screens and porous metal), and industrial processes including bacteria, dust, pollen and general air filtration as well as a base for impregnation with fluids such as coatings.

What is claimed is:
1. A filter material comprising a woven glass cloth, glass fibers bonded within the interstices of said cloth, and a polytetrafluoroethylene impregnant within said filter material.
2. A filter material comprising a woven glass cloth, glass fibers bonded within the interstices of said cloth, and a silicone impregnant within said filter material.
3. A filter material comprising a woven glass cloth, glass fibers bonded within the interstices of said cloth and an impregnant within said filter material.

References Cited in the file of this patent
UNITED STATES PATENTS

| | | |
|---|---|---|
| 1,766,096 | Benedict | June 24, 1930 |
| 1,782,784 | Manning | Nov. 25, 1930 |
| 1,854,414 | Milkey | Apr. 19, 1932 |
| 1,921,504 | Chase et al. | Aug. 8, 1933 |
| 2,383,066 | McDermott | Aug. 21, 1945 |
| 2,395,301 | Sloan | Feb. 19, 1946 |
| 2,563,288 | Steinman | Aug. 7, 1951 |
| 2,648,617 | Hanson | Aug. 11, 1953 |
| 2,739,713 | Robinson | Mar. 27, 1956 |
| 2,906,660 | Hungerford et al. | Sept. 29, 1959 |

FOREIGN PATENTS

| | | |
|---|---|---|
| 781,512 | Great Britain | Aug. 21, 1957 |

OTHER REFERENCES

"Chemical Engineering," vol. 67, No. 11, May 30, 1960; page 74.